(12) United States Patent
Sato et al.

(10) Patent No.: US 9,343,889 B2
(45) Date of Patent: May 17, 2016

(54) ELECTRIC WIRE FIXING DEVICE

(75) Inventors: Koki Sato, Kakegawa (JP); Takeshi Onoda, Kakegawa (JP)

(73) Assignee: Yazaki Corporation, Tokyo (JP)

(*) Notice: Subject to any disclaimer, the term of this patent is extended or adjusted under 35 U.S.C. 154(b) by 366 days.

(21) Appl. No.: 13/883,875

(22) PCT Filed: Nov. 8, 2011

(86) PCT No.: PCT/JP2011/076126
§ 371 (c)(1), (2), (4) Date: May 7, 2013

(87) PCT Pub. No.: WO2012/063952
PCT Pub. Date: May 18, 2012

(65) Prior Publication Data
US 2013/0228367 A1 Sep. 5, 2013

(30) Foreign Application Priority Data
Nov. 9, 2010 (JP) ................................. 2010-250740

(51) Int. Cl.
*H02G 15/007* (2006.01)
*B60R 16/02* (2006.01)

(52) U.S. Cl.
CPC .......... *H02G 15/007* (2013.01); *B60R 16/0215* (2013.01)

(58) Field of Classification Search
CPC .................................................. H02G 15/007
USPC .............. 174/480, 72 A, 71 R, 72 R; 439/471
See application file for complete search history.

(56) References Cited

U.S. PATENT DOCUMENTS 6,294,736 B1 * 9/2001 Takeda ................. H02G 3/30
174/72 A
2010/0147579 A1 * 6/2010 Kaplan .......................... 174/481

FOREIGN PATENT DOCUMENTS

JP 57-88980 U 11/1980
JP 2001-208281 A 8/2001
(Continued)

OTHER PUBLICATIONS

Office Action mailed Aug. 26, 2014, issued for the Japanese patent application No. 2010-250740 and English translation thereof.
(Continued)

*Primary Examiner* — Jenny L Wagner
*Assistant Examiner* — Michael P McFadden
(74) *Attorney, Agent, or Firm* — Locke Lord LLP

(57) ABSTRACT

There is provide an electric wire fixing device improving storage performance of electric wires while preventing the electric wires from being displaced along a longitudinal direction of the electric wire. An electric wire fixing device includes a bottom wall at which an electric wire is disposed and a pair of side walls extending from the bottom wall to position the electric wire between each other, one side wall being provided with a hole through which a fixation member for fixing the electric wire is passed. The fixation member is passed through the hole and wound around the electric wires so that the electric wires are placed close to the bottom wall and fixed. The bottom wall includes a projecting piece extending from the bottom wall and located between the electric wires and the bottom wall, and the fixation member is passed between the projecting piece and the bottom wall.

20 Claims, 9 Drawing Sheets

(56) References Cited

FOREIGN PATENT DOCUMENTS

| | | |
|---|---|---|
| JP | 2005-080429 A | 3/2005 |
| JP | 2007-166805 A | 6/2007 |
| JP | 2009-065798 A | 3/2009 |
| JP | 2009-131055 A | 6/2009 |

OTHER PUBLICATIONS

International Search Report dated Feb. 16, 2012 and Written Opinion of the International Search Authority, issued for PCT/JP2011/076126.

* cited by examiner

ELECTRIC WIRE FIXING DEVICE

TECHNICAL FIELD

The present invention relates to an electric wire fixing device used to wire electric wires within an engine room of a motor vehicle and such.

BACKGROUND ART

FIG. 9 is a perspective view showing a cross-section of a conventional electric wire fixing device. A conventional electric wire fixing device 101 shown is formed into a gutter-like shape with a bottom wall 114 at which electric wires 7 are disposed and a pair of side walls 113, 115 extending from the bottom wall 114 to position the electric wires 7 between each other.

The side wall 113 is provided with a hole 113a through which a binder member 8 as a fixation member for fixing the electric wires 7 is passed.

For the above-described electric wire fixing device 101, the electric wires 7 are disposed on the bottom wall 114. A tip end portion of the binder band 8 is passed through the hole 113a, and the binder band 8 is wound around the electric wires 7 so the electric wires 7 are placed close to the side wall 113 and fixed (refer to below-listed Patent Documents 1 and 2).

However, the above-described conventional electric wire fixing device 101 has a following problem. That is, by winding the binder band 8 around the electric wires 7, the electric wires 7 are placed close to the side wall 113 and fixed. Thus, there is created a useless space or a dead space (indicated by a reference sign D in FIG. 9) between the fixed electric wires 7 and the bottom wall 114. As a result, the conventional electric wire fixing device 101 has a poor storage performance when the electric wires 7 are fixed at the electric wire fixing device 1.

There is proposed an electric wire fixing device for solving the above-described problem (refer to Patent Document 3). FIG. 10 is a cross-sectional view of another conventional electric wire fixing device. An electric wire fixing device 201 disclosed in Patent Document 3 which is shown in FIG. 10 is provided with a bottom wall 114, a pair of ribs 117 projecting from the bottom wall 114 towards an electric wire 7 so as to position between each other a binder band 8 which has been passed through a hole 113a, and a connection portion 116 connecting the pair of ribs 117 to each other. The connection portion 116 is positioned so as to pass the binder band 8 between the connection portion 116 and the bottom wall 114. Furthermore, the pair of ribs 117 and the connection portion 116 are arranged with a space from a side wall 113. In FIG. 10, structure elements similar to those of the above-described conventional electric wire fixing device 101 are indicated by the same reference signs, respectively, to eliminate explanation thereof.

For the conventional electric wire fixing device 201, the electric wire 7 is disposed at the bottom wall 114, and a tip end portion of the binder band 8 is passed through the hole 113a and then passed between the pair of ribs 117, the connection portion 116 and the bottom wall 114. Then, the binder band 8 is wound around the electric wire 7, and thus the electric wire 7 is placed close to the side wall 113 and fixed.

PRIOR ART DOCUMENT

Patent Document

Patent Document 1: Japanese Patent Application Publication No. 2005-80429

Patent Document 2: Japanese Patent Application Publication No. 2009-65798

Patent Document 2: Japanese Patent Application Publication No. 2001-208281

SUMMARY OF THE INVENTION

Problem to be Solved by the Invention

However, the above-described conventional electric wire fixing device 201 has a following problem. That is, when fixing the electric wire 7 at the conventional electric wire fixing device 201, the electric wire 7 is disposed at the bottom wall 114, and the binder band 8 is passed through the hole 113a. At that time, the tip end portion of the binder band 8 may move towards the electric wire 7 through the above-described space between the pair of ribs 117, the connection portion 116 and the side wall 113. Thus, the assembling workability is reduced.

In view of the above-described problems, an object of the present invention is to provide an electric wire fixing device having improved storage performance of electric wires and improved assembling workability.

Means for Solving the Problem

In order to achieve the above-mentioned objects, the present invention provides, in a first aspect, an electric wire fixing device having a bottom wall at which an electric wire is disposed and a pair of side walls extending from the bottom wall so as to position the electric wire between each other, wherein one side wall of the pair of side walls is provided with a hole through which a fixation member fixing the electric wire is passed, and wherein the fixation member is passed through the hole and wound around the electric wire so that the electric wire is placed close to the one side wall and fixed, wherein the one side wall is further provided with a projecting piece arranged at a side of the hole distant from the bottom wall, the projecting piece extending from the one side wall toward the other side wall, and wherein the projecting piece is positioned between the electric wire and the bottom wall and is positioned so that the fixation member is passed between the projecting piece and the bottom wall.

Furthermore, the present invention provides, in a second aspect, the electric wire fixing device described above wherein the projecting piece is provided with a protrusion projecting towards the electric wire and contacting the electric wire.

Furthermore, the present invention provides, in a third aspect, the electric wire fixing device described above, wherein the protrusion is arranged at an end of the projecting piece distant from the one side wall.

Furthermore, the present invention provides, in a fourth aspect, the electric wire fixing device described above, further having a pair of ribs projecting from the bottom wall towards the electric wire, wherein the pair of ribs is located at an interval along a longitudinal direction of the electric wire so that the fixation member is passed between the pair of ribs, and wherein the pair of ribs extends along a direction of movement of the fixation member.

Furthermore, the present invention provides, in a fifth aspect, the electric wire fixing device described above, wherein the projecting piece and the pair of ribs are connected to each other.

Furthermore, the present invention provides, in a sixth aspect, the electric wire fixing device described above, further having a pair of second ribs projecting from the other side wall towards the electric wire, wherein the pair of second ribs is located at an interval along a longitudinal direction of the electric wire so that the fixation member is passed between the second ribs, and wherein the pair of second ribs extends along a direction of movement of the fixation member.

Furthermore, the present invention provides, in a seventh aspect, the electric wire fixing device described above, further having a cover covering an opening portion located opposite of the bottom wall, wherein the projecting piece is arranged at a side distant from the opening portion.

Furthermore, the present invention provides, in an eighth aspect, the electric wire fixing device described above, wherein the one side wall is provided with a cut-out portion formed by cutting out an edge of the one side wall distant from the bottom wall, wherein the fixation member is passed through the hole, wound around the electric wire and then passed through the cut-out portion.

Advantageous Effects of the Invention

According to the first aspect of the present invention described above, the electric wire fixing device includes the bottom wall at which the electric wire is disposed and the pair of side walls extending from the bottom wall so as to position the electric wire between each other, wherein the one side wall of the pair of side walls is provided with the hole through which the fixation member fixing the electric wire is passed, and wherein the fixation member is passed through the hole and wound around the electric wire so that the electric wire is placed close to the one side wall and fixed, wherein the one side wall is further provided with the projecting piece arranged at a side of the hole distant from the bottom wall, the projecting piece extending from the one side wall toward the other side wall, and wherein the projecting piece is positioned between the electric wire and the bottom wall and is positioned so that the fixation member is passed between the projecting piece and the bottom wall. Consequently, the electric wire is placed close to the projecting piece and fixed by the fixation member. Thus, the electric wires are positioned at a predetermined position at the electric wire fixing device, thereby improving the storage performance of the electric wires. Furthermore, since the projecting piece is located between the electric wire and the fixation member, when passing the fixation member between the bottom wall and the electric wire disposed on the bottom wall, the tip end portion of the binder band is prevented from being moved towards the electric wire through a space (gap) between the bottom wall and the projecting piece, as was the case in the conventional electric wire fixing device described in Patent Document 3. Thus, the tip end portion can be passed between the bottom wall and the projecting piece, thereby improving the assembling workability of the electric wire fixing device.

According to the second aspect of the present invention described above, the projecting piece is provided with the protrusion arranged to project towards the electric wire and contact the electric wire. Consequently, when the electric wires are positioned at a predetermined position at the electric wire fixing device, the protrusion is in contact with the electric wire. Thus, the electric wire can be prevented from being displaced along the longitudinal direction of the electric wire.

According to the third aspect of the present invention described above, the protrusion is arranged at the end of the projecting piece distant from the one side wall. When the fixation member is passed between the bottom wall and the projecting piece and wound around the electric wire, a tip end portion of the projecting piece is applied with a force by the fixation member in a direction away from the bottom wall, causing deformation of the tip end portion of the projecting piece. However, the protrusion prevents the tip end portion from being deformed, thereby improving strength of the tip end portion of the projecting piece.

According to the fourth aspect of the present invention described above, the electric wire fixing device further includes the pair of ribs projecting from the bottom wall towards the electric wire, wherein the pair of ribs is located at an interval along the longitudinal direction of the electric wire so that the fixation member is passed between the pair of ribs, and wherein the pair of ribs extends along a direction of movement of the fixation member. Consequently, the tip end portion of the fixation member which has been passed through the hole can be guided by the pair of ribs between the electric wire and the bottom wall along a direction of movement of the fixation member, thereby further improving the assembling workability.

According to the fifth aspect of the present invention described above, the projecting piece and the pair of ribs are connected to each other. When the fixation member is passed between a second wall and the projecting piece and wound around the electric wire, the projecting piece is applied with a force by the fixation member in a direction away from the second wall, causing deformation of the projecting piece. However, the projecting piece and the pair of ribs connected to each other can prevent the projecting piece from being deformed, thereby improving strength of the projecting piece.

According to the sixth aspect of the present invention described above, the electric wire fixing device further includes the pair of second ribs projecting from the other side wall towards the electric wire, wherein the pair of second ribs is located at an interval along the longitudinal direction of the electric wire so that the fixation member is passed between the pair of second ribs, and wherein the pair of second ribs extends along a direction of movement of the fixation member. Consequently, the tip end portion of the fixation member which has been passed through the hole can be guided by the pair of second ribs between the electric wire and the side wall along a direction of movement of the fixation member, thereby further improving the assembling workability.

According to the seventh aspect of the present invention described above, the electric wire fixing device further includes the cover covering the opening portion located opposite of the bottom wall, wherein the projecting piece is arranged at a side distant from the opening portion. Consequently, the electric wires are placed close to the projecting piece and fixed by the fixation member, thus there is no need to push the electric wires into a bottom of the opening portion (i.e. into an opposite side of the opening portion) when mounting the cover. In other words, since the electric wires are positioned at a predetermined position at the electric wire fixing device, the electric wires can be prevented from being stuck between the cover and the pair of side walls when mounting the cover. Thus, the assembling workability can be improved even more.

According to the eighth aspect of the present invention described above, the one side wall is provided with the cut-out portion formed by cutting out the edge of the one side wall distant from the bottom wall, wherein the fixation member is passed through the hole, wound around the electric wire and then passed through the cut-out portion. Consequently, the fixation member can be prevented from being displaced along the longitudinal direction, thereby further improving the assembling workability. Moreover, the fixation member can be prevented from being stuck between the cover and the pair of side walls when mounting the cover covering the opening portion located opposite of the bottom wall. As a result, the assembling workability can be improved even more.

DESCRIPTION OF EMBODIMENTS

Figure 1:
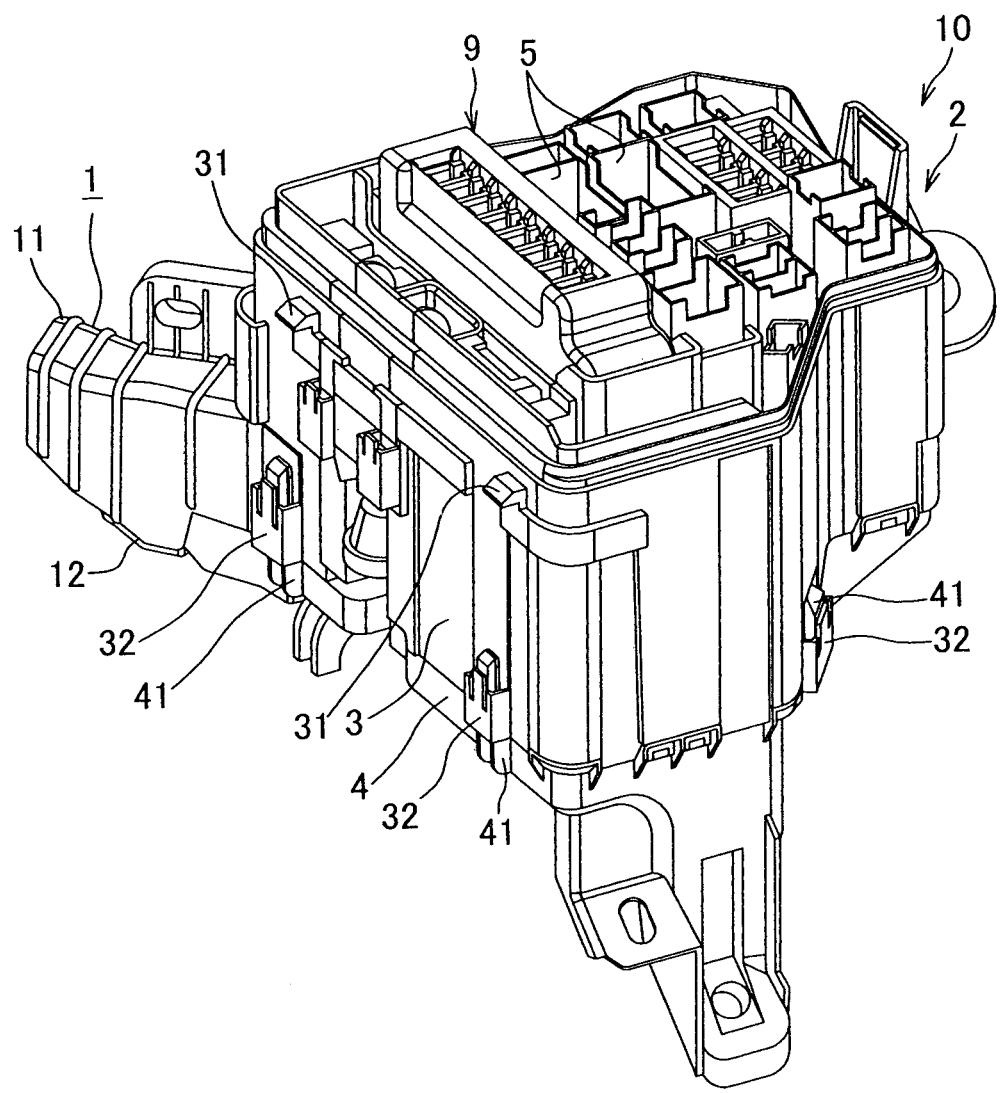
FIG. 1 is a perspective view of one embodiment of an electrical connection box having an electric wire fixing device according to the present invention.

The following will describe one embodiment of an electric wire fixing device according to the present invention with reference to FIGS. 1 through 8. An electric wire fixing device shown in FIG. 1 is provided to (incorporated in) an electrical connection box 10 which is mounted to, for example, an engine room of a motor vehicle to supply power to various electric components mounted within the motor vehicle. In the specification, the electrical connection box 10 is a generic term that includes a junction block, a fuse block and a relay box.

As shown in FIG. 1, the electrical connection box 10 is provided with a box body 2 receiving a plurality of electric components 9 and a passage portion 1 as an electric wire fixing device projecting from the box body 2 to lead out electric wires 7 outside of the box body 2.

Figure 2:
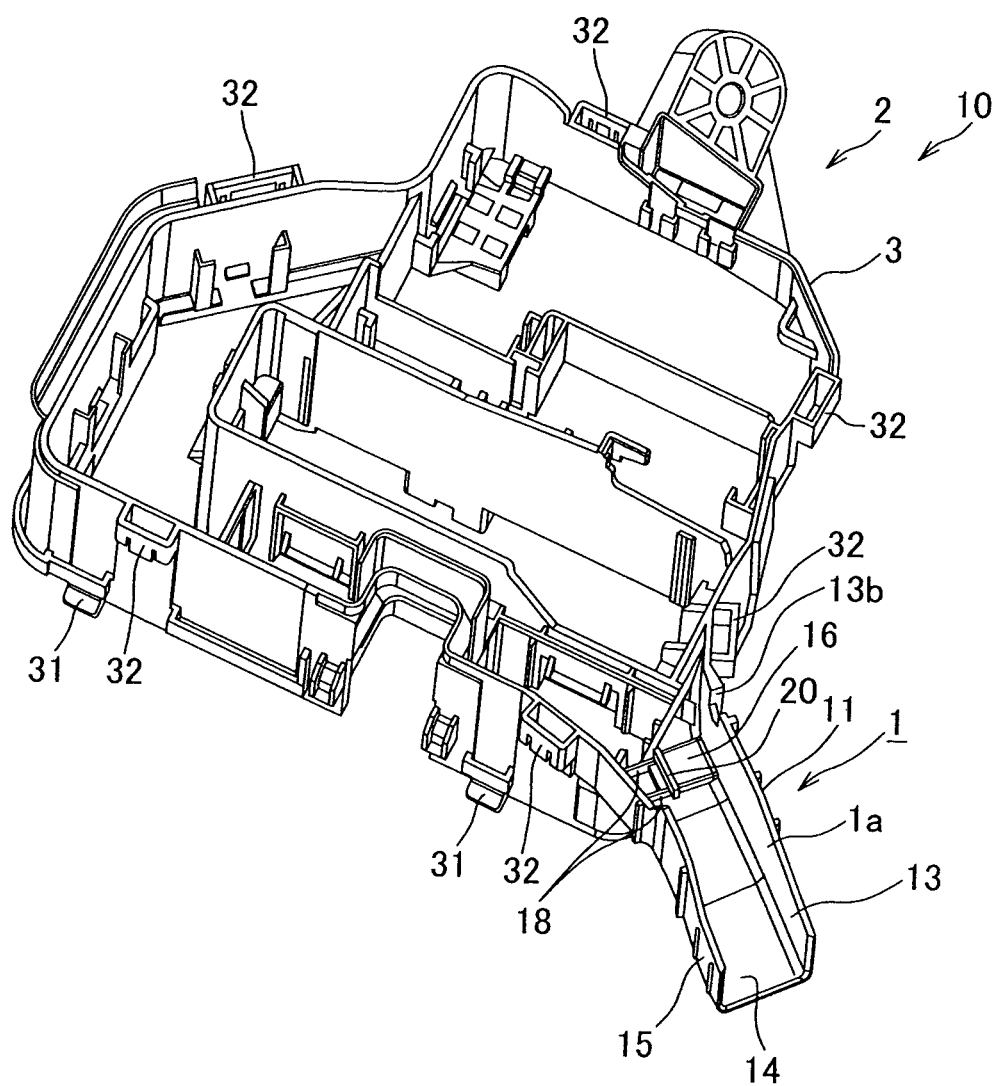
FIG. 2 is a perspective view of a gutter-shaped portion of the electric wire fixing device shown in FIG. 1.

As shown in FIGS. 1 and 2, the box body 2 is provided with a body portion 3 formed into a frame-like shape, an upper cover removably attached to the body portion 3 so as to cover a top face of the body portion 3 and a lower cover removably attached to the body portion 3 so as to cover a bottom face of the body portion 3 located opposite of the top face. The box body 2 is arranged to receive the plurality of electric components 9 mounted to a cassette block 5 made of synthetic resin. In FIG. 1, the upper cover (not shown) is removed.

The body portion 3 is made of synthetic resin and is formed by known injection molding. The body portion 3 is provided with a lock receive portion 31 arranged to engage with a later-described lock portion of the upper cover and an engagement receive portion 32 arranged to engage with a later-described engagement portion 41 of the lower cover 4.

The upper cover is made of an insulating synthetic resin and is formed into a bottomed-tube by known injection molding. The upper cover is provided with the lock portion (not shown).

The lower cover 4 is made of an insulating synthetic resin and is formed into a bottomed-tube by known injection molding. The lower cover 4 is provided with the plurality of engagement portions 41.

Figure 3:
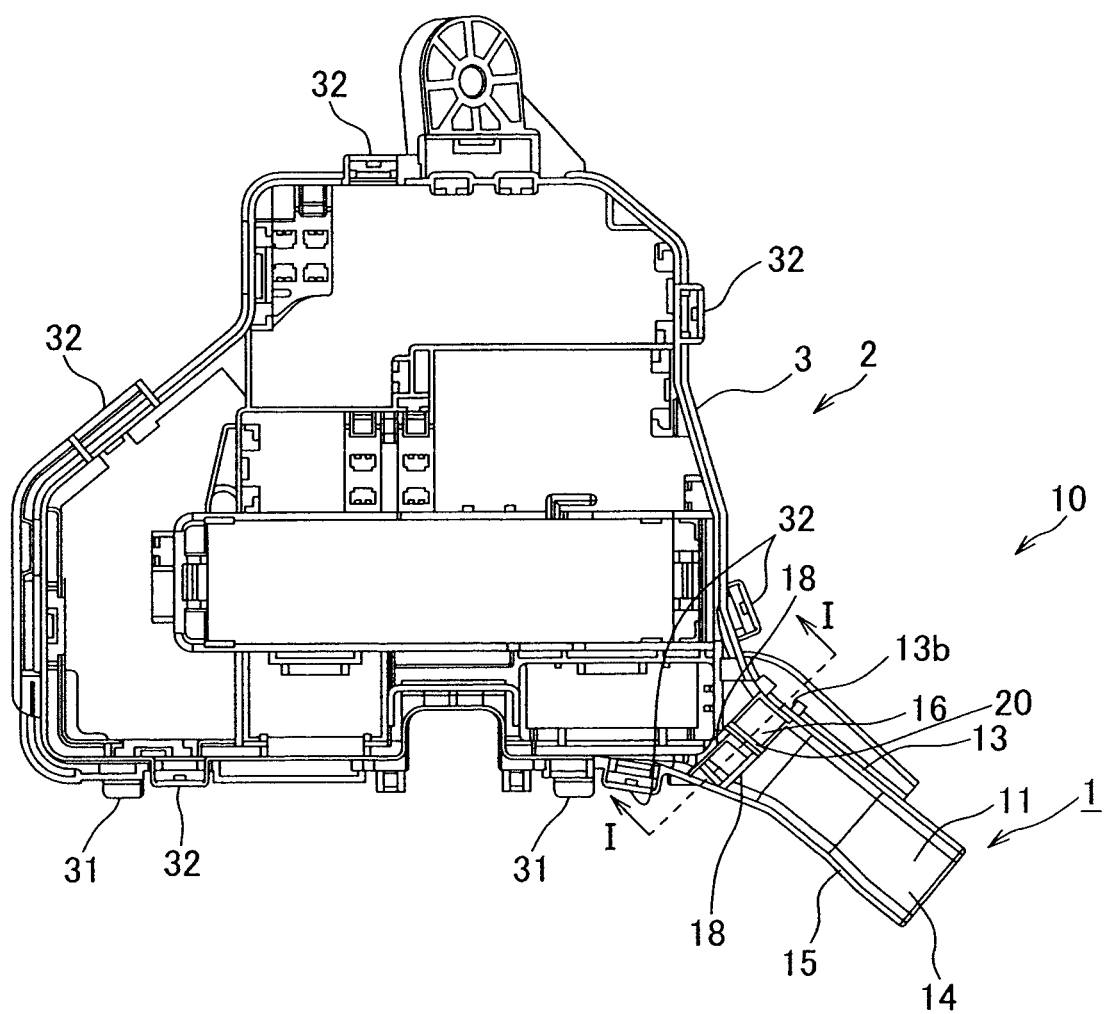
FIG. 3 is a top view of the gutter-shaped portion shown in FIG. 2.

The respective electric wires 7 have one end connected to the electric component 9. As shown in FIGS. 2 and 3, the passage portion 1 is arranged to pass a side of the electric wire 7 adjacent the other end of the electric wire 7 through the passage portion 1 and leads to outside of the box body 2. The passage portion 1 is formed into a tubular shape and is arranged to communicate through an inside and an outside of the box body 2. Furthermore, an axial direction of the passage portion 1 is arranged parallel to a longitudinal direction of the electric wires 7 passed within the passage 1.

The passage portion 1 is arranged to extend from an edge of the bottom face of the body portion 3. The passage portion 1 is provided with a gutter-shaped portion 11 formed into a gutter-like shape and a cover 12 (shown in FIG. 1) extending from an edge of the lower cover 4 placed over the edge of the bottom face and attached to the gutter-shaped portion 11 so as to cover an opening portion 1a of the gutter-shaped portion 11. The opening portion 1a is located opposite of a later-described bottom wall 14 of the gutter-shaped portion 11.

Figure 4:
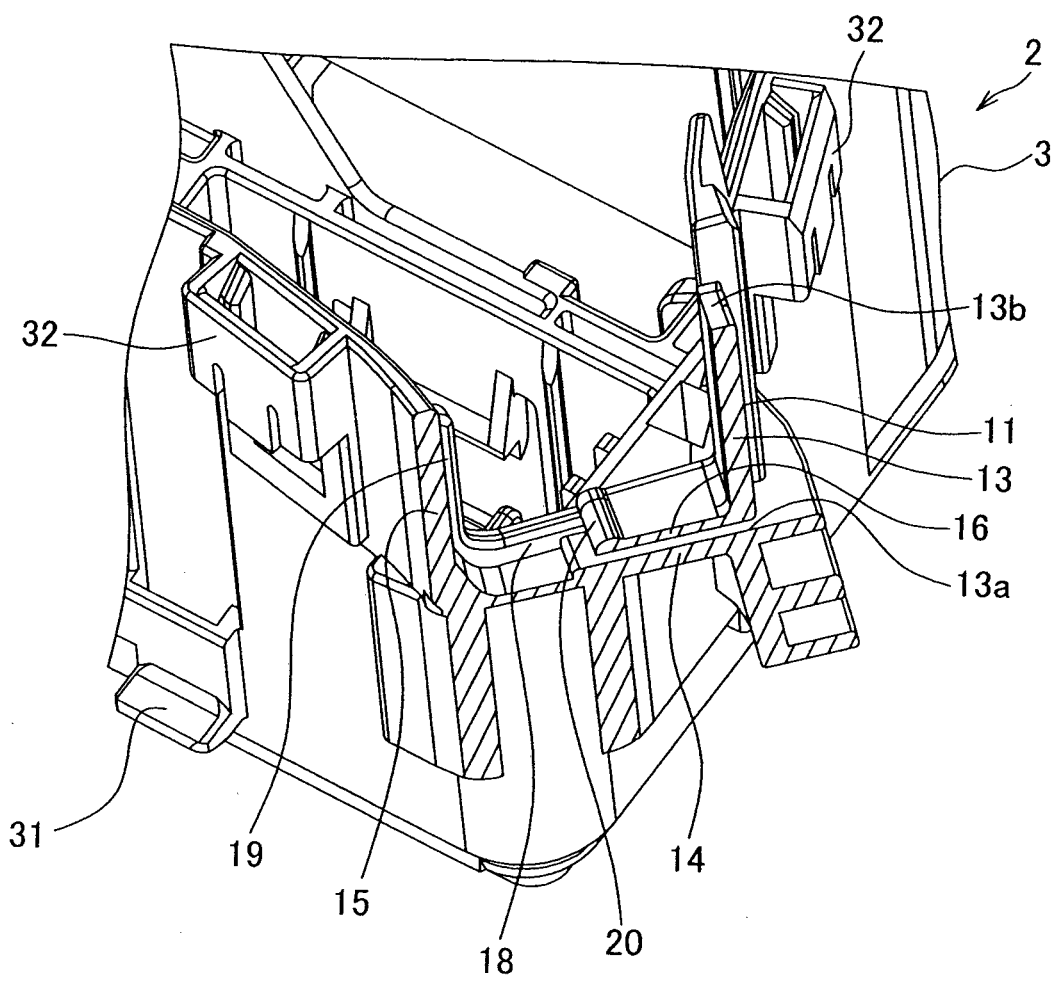
FIG. 4 is a cross-sectional view taken along a I-I line shown in FIG. 3.
Figure 5:
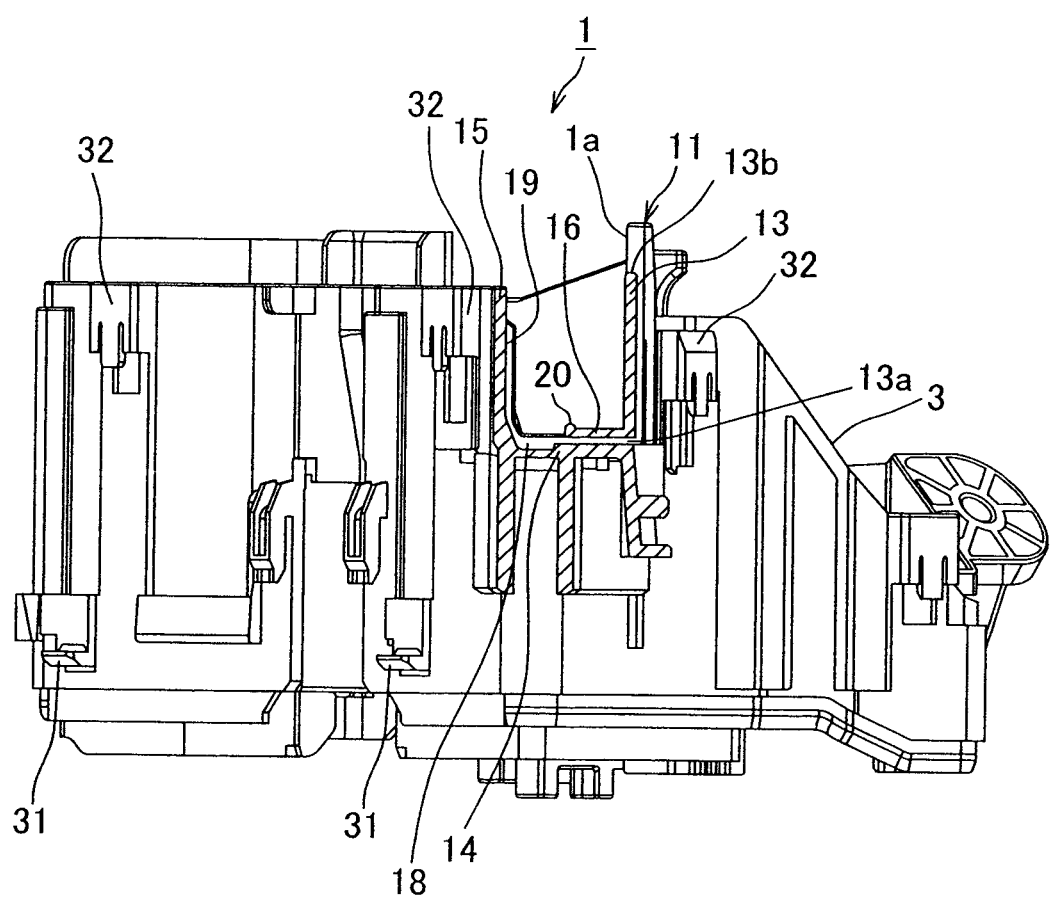
FIG. 5 is a side view showing the cross-section of the gutter-shaped portion shown in FIG. 4.
Figure 6:
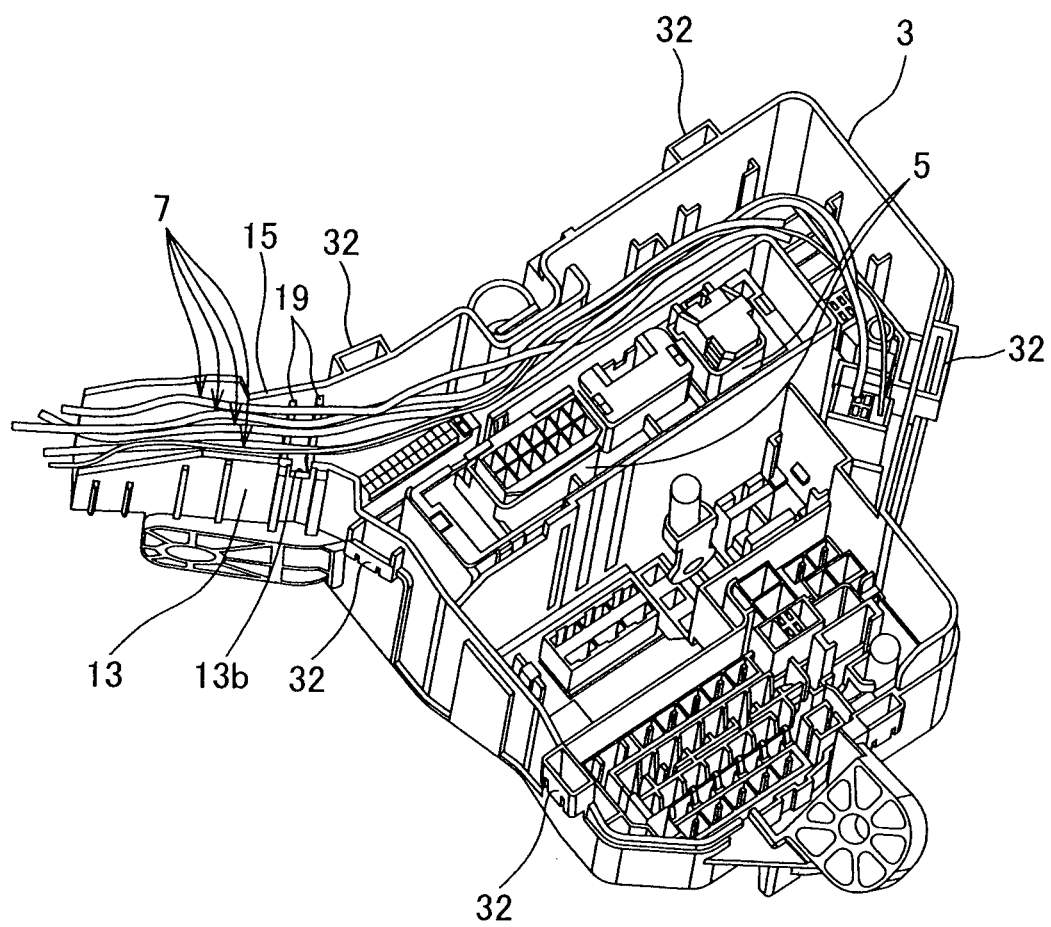
FIG. 6 is an illustration for explaining an assembling of the electric wire fixing device shown in FIG. 1, wherein electric wires are arranged at a passage portion.
Figure 7:
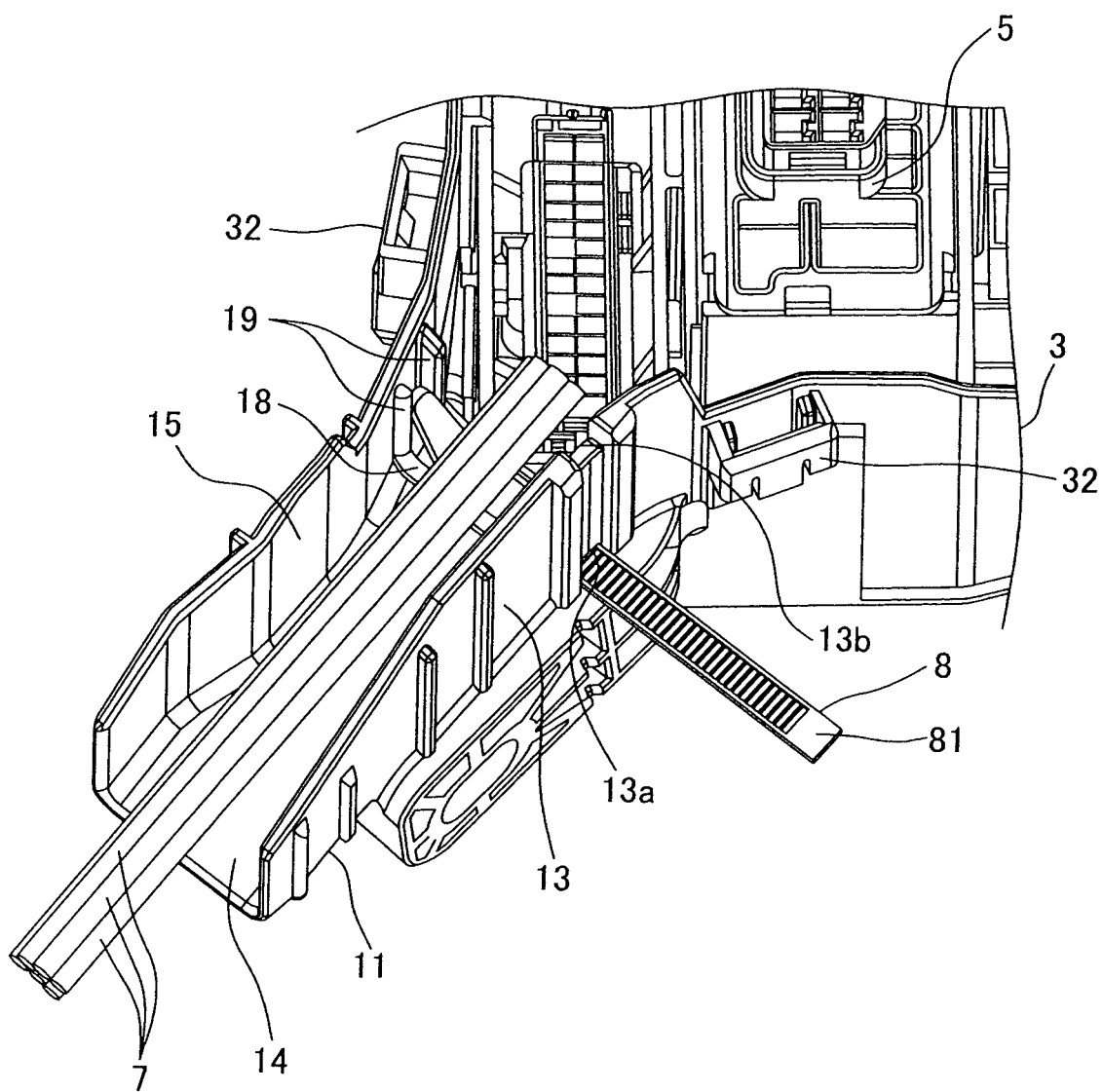
FIG. 7 is an illustration for explaining an assembling of the electric wire fixing device shown in FIG. 6, wherein a binder band is passed between the passage portion and the electric wires.

As shown in FIGS. 4 and 5, the gutter-shaped portion 11 is provided with the bottom wall 14 at which the electric wire 7 is disposed and a pair of side walls 13, 15 extending from the bottom wall 14 to position the electric wires 7 between each other. These side walls 13, 15 are arranged to face each other. In addition, among the pair of side walls 13 and 15, the side wall 13 corresponds to "one side wall" described in the claims, and the side wall 15 corresponds to "the other side wall" described in the claims.

The side wall 13 is provided with a hole 13a through which a binder band 8 as a fixation member for fixing the electric wire 7 is passed, a cut-out portion 13b and a projecting piece 16.

The hole 13a is arranged to penetrate through the side wall 13 and is provided at an end of the side wall 13 adjacent the bottom wall 14.

The cut-out portion 13b is formed by cutting an edge of the side wall 13 distant from the bottom wall 14, and thus is provided at an end of the side wall 13 distant from the bottom wall 14. The binder band 8 which has been passed through the hole 13a and wound around the electric wires 7 is then passed through the cut-out portion 13b.

The projecting piece 16 is arranged between the electric wire 7 and the bottom wall 14 and is arranged so that the binder band 8 is passed between the projecting piece 16 and the bottom wall 14. The projecting piece 16 is formed into a plate-like shape. Furthermore, the projecting piece 16 is arranged so that one end of the projecting piece 16 is continuous with an edge of the hole 13a distant from the bottom wall 14 (i.e. with the side wall 13) while the other end of the projecting piece 16 extends towards the side wall 15. In other words, the projecting piece 16 extends from the side wall 13 towards the side wall 15. Furthermore, the projecting piece 16 is arranged along an inner surface of the bottom wall 14 so as to face the bottom wall 14.

Furthermore, the projecting piece 16 is provided with a protrusion 20 projecting towards the electric wire 7. This protrusion 20 is arranged at the end of the projecting piece 16 distant from the side wall 13. Also, this protrusion 20 is arranged so as to contact an outer circumference of the electric wire 7.

Furthermore, the gutter-shaped portion 11 is provided with a pair of ribs 18 and a pair of ribs 19.

The pair of first ribs 18 is arranged to project from the bottom wall 14 towards the electric wire 7. Also, the pair of first ribs 18 is located at an interval along the longitudinal direction of the electric wire 7 so that the binder band 8 which has been passed through the hole 13a is passed between the pair of first ribs 18. For each of the first ribs 18, one end of the first rib 18 is continuous with an edge of the hole 13a adjacent the bottom wall 14 (i.e. with the side wall 13) while the other end of the first rib 18 is continuous with the side wall 15. Thus, the pair of first ribs 18 extends along a direction of movement of the binder band 8. Furthermore, the respective first ribs 18 connect to the projecting piece 16. The pair of first ribs 18 corresponds to "a pair of ribs" described in the claims.

The pair of second ribs 19 is arranged to project from the side wall 15 towards the electric wire 7. Also, the pair of second ribs 19 is located at an interval along the longitudinal direction of the electric wire 7 so that the binder band 8 which has been passed through the pair of first ribs 18 is passed between the pair of second ribs 19. For the respective second ribs 19, one end of the second rib 19 is continuous with the first rib 18 while the other end of the second rib 19 extends in a direction away from the bottom wall 13. Thus, the pair of second ribs 18 extends along a direction of movement of the binder band 8.

The following will explain an assembling procedure of the electrical connection box 10 having the above-described passage portion 1 as the electric wire fixing device. Firstly, the respective electric components 9 connected to the one end of the respective electric wires 7 are mounted to the cassette blocks 5. Then the cassette blocks 5 mounted with the respective electric components 9 are received in the body portion 3. Alternatively, firstly the cassette blocks 5 mounted with the respective electric components 9 may be received in the body portion 3 and then the one end of the respective electric wires 7 may be connected to the respective electric components 9. Next, the side of the electric wire 7 adjacent the other end of the electric wire 7 is passed through the gutter-shaped portion 11 and is drawn outside of the body portion 3 (shown in FIG. 6). Thus, the side of the electric wire 7 adjacent the other end of the electric wire 7 is placed at the bottom wall 14 of the gutter-shaped portion 11.

Next, while the side of the electric wire 7 adjacent the other end of the electric wire 7 is placed at the bottom wall 14, a tip end portion of the binder band 8 is passed through the hole 13a and moved forward between the bottom wall 14 and the projecting piece 16 as well as between the pair of first ribs 18. In this state, the tip end portion (i.e. the binder band 8) is positioned between the electric wire and the bottom wall 14 (refer to FIG. 7). As the tip end portion moves forward further, the tip end portion is positioned between the pair of second ribs 19. In this state, the tip end portion (i.e. the binder band 8) is positioned between the electric wire 7 and the side wall 15. Then, as the tip end portion moves forward further, the tip end portion is passed through the cut-out portion 13b and drawn outside of the passage portion 1. Consequently, a band body 81 of the binder band 8 is wound around the outer circumference of the electric wires 7.

Figure 8:
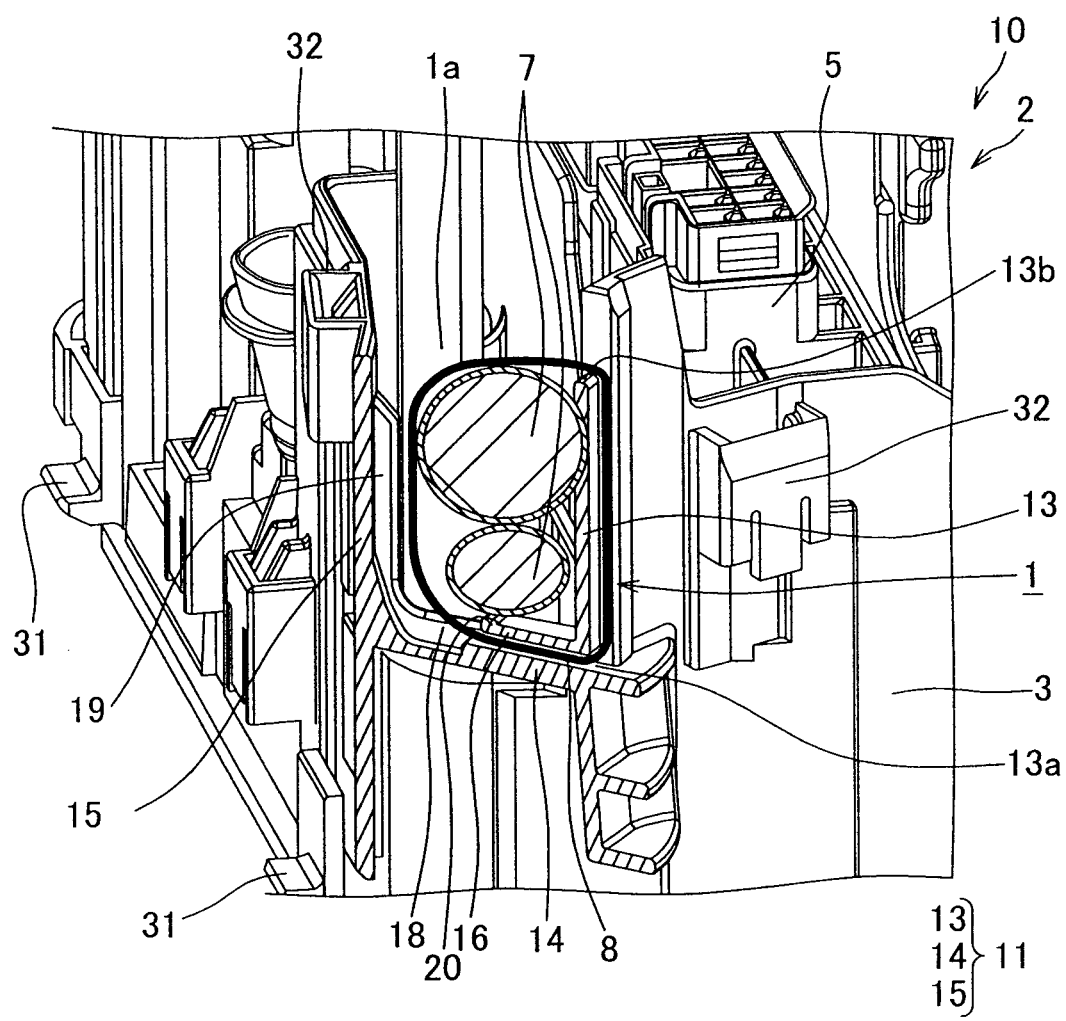
FIG. 8 is an illustration for explaining an assembling of the electric wire fixing device shown in FIG. 7, wherein the electric wires are fixed at the passage portion by the binder band.
Figure 9:
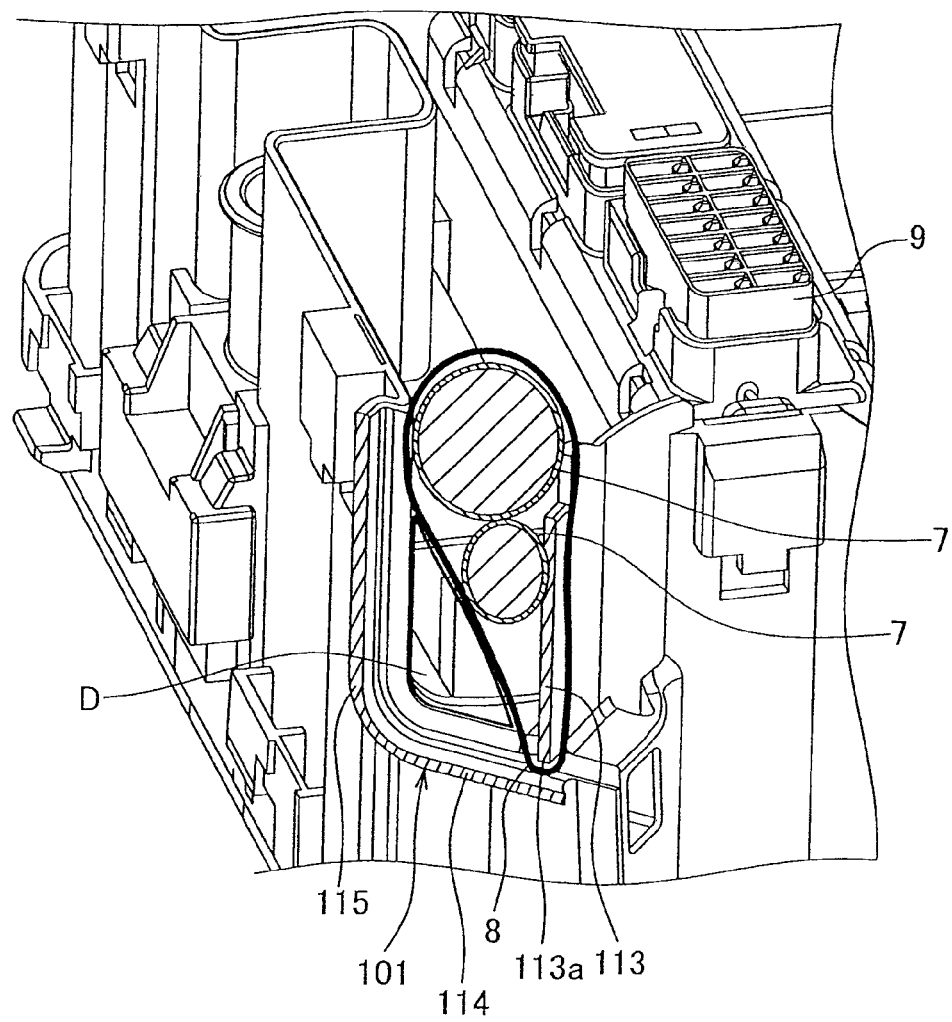
FIG. 9 is a perspective view showing a cross-section of a conventional electric wire fixing device.
Figure 10:
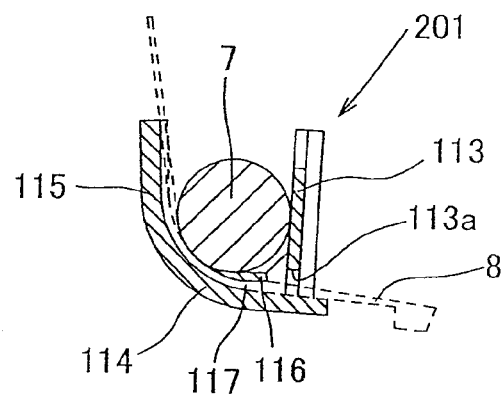
FIG. 10 is a cross-sectional view of a conventional electric wire fixing device.

Moreover, the tip end portion drawn outside of the passage portion 1 from the cut-put portion 13b is then passed through a pass-though opening of the bound portion described above, thus the other end portion of the band body 81 is fixed at the bound portion. Consequently, as shown in FIG. 8, the electric wires 7 are placed close to the projecting piece 16 and fixed by the binder band 8. As a result, the electric wires 7 are placed at a predetermined position at the passage portion 1.

Then, with the electric wires 7 being placed at a predetermined position at the passage portion 1, the lower cover 4 is moved towards the bottom face of the body portion 3 to cover the bottom face of the body portion 3. By doing so, the engagement portion 41 of the lower cover 4 can be engaged with the engagement receiving portion 32 of the body portion 3 while the cover 12 being mounted to cover the opening portion 1a of the gutter-shaped portion 11, thereby completing the assembling of the passage portion 1 as the electric wire fixing device.

Finally, the upper cover is moved towards the top face of the body portion 3 to cover the top face of the body portion 3. Then, the lock portion of the upper cover is engaged with the lock receiving portion 3 of the body portion 3, thereby completing the assembling of the box body 2 and finishing the electrical connection box 10.

According to the above-described embodiment, the electric wire fixing device 1 includes the bottom wall 14 at which the electric wires 7 are disposed and the pair of side walls 13, 15 extending from the bottom wall 14 so as to position the electric wires 7 between each other, wherein the one side wall 13 of the pair of side walls 13, 15 is provided with the hole 13a through which the binder band 8 as the fixation member fixing the electric wire 7 is passed, and wherein the binder band 8 is passed through the hole 13 and wound around the electric wires 7 so that the electric wires 7 are placed close to the one side wall 13 and fixed. The one side wall 13 is further provided with the projecting piece 16 arranged at a side of the hole 13a distant from the bottom wall 14, the projecting piece 16 extending from the one side wall 13 toward the other side wall 15. The projecting piece 16 is positioned between the electric wire 7 and the bottom wall 14 and is positioned so that the binder band 8 is passed between the projecting piece 16 and the bottom wall 14. Consequently, the electric wires 7 are placed close to the projecting piece 16 and fixed by the binder band 8. Thus, the electric wires 7 are positioned at a predetermined position at the electric wire fixing device 1, thereby improving the storage performance of the electric wires 7. Furthermore, since the projecting piece 16 is positioned between the electric wire 7 and the binder band 8, when passing the binder band 8 between the bottom wall 14 and the electric wires 7 disposed on the bottom wall 14, the tip end portion of the binder band 8 can be prevented from being moved towards the electric wire 7 through a space (gap) between the bottom wall 14 and the projecting piece 16, as was the case in the conventional electric wire fixing device 201 described in Patent Document 3. Thus, the tip end portion is passed between the bottom wall 14 and the projecting piece 16, thereby improving the assembling workability of the electric wire fixing device 1.

Furthermore, the projecting piece 16 is provided with the protrusion 20 arranged to project towards the electric wire 7 and contact the electric wire 7. Consequently, when the electric wires 7 are positioned at a predetermined position at the electric wire fixing device 1, the protrusion 20 is in contact with the electric wires 7. Thus, the electric wires 7 can be prevented from being displaced along the longitudinal direction of the electric wire 7.

Furthermore, the protrusion 20 is arranged at the end of the projecting piece 16 distant from the one side wall 13. When the binder band 8 is passed between the bottom wall 14 and the projecting piece 16 and wound around the electric wires 7, a tip end portion of the projecting piece 16 may be applied with a force by the binder band 8 in a direction away from the bottom wall 14, causing deformation of the tip end portion of the projecting piece 16. However, the protrusion 20 can prevent the tip end portion from being deformed, thereby improving strength of the tip end portion of the projecting piece 16.

Furthermore, there is provided the pair of first ribs 18 projecting from the bottom wall 14 towards the electric wire 7, the pair of first ribs 18 being located at an interval along the longitudinal direction of the electric wire 7 so that the binder band 8 is passed between the pair of first ribs 18, and the pair of first ribs 18 being arranged along a direction of movement of the binder band 8. Consequently, the tip end portion of the binder band 8 which has been passed through the hole 13a can be guided by the pair of first ribs 18 between the electric wire 7 and the bottom wall 14 along a direction of movement of the binder band 8, thereby further improving the assembling workability.

Furthermore, the projecting piece 16 and the pair of ribs 18, 19 are connected to each other. When the binder band 8 is passed between a second wall portion and the projecting piece and wound around the electric wire, the projecting piece may be applied with a force by the binder band 8 in a direction away from the second wall portion, causing deformation of the projecting piece. However, the projecting piece and the pair of ribs connected to each other can prevent the projecting piece from being deformed, thereby improving strength of the projecting piece.

Furthermore, the electric wire fixing device further includes the pair of second ribs projecting from the other side wall towards the electric wire, wherein the pair of second ribs is located at an interval along the longitudinal direction of the electric wire so that the binder band 8 is passed between the pair of second ribs, and wherein the pair of second ribs extends along a direction of movement of the binder band 8. Consequently, the tip end portion of the binder band 8 which has been passed through the hole can be guided by the pair of second ribs between the electric wire and the side wall along a direction of movement of the binder band 8, thereby further improving the assembling workability.

Furthermore, there is provided the cover 12 covering the opening portion 1a located opposite of the bottom wall 14, the projecting piece 16 being arranged at a side distant from the opening portion 1a. Consequently, the electric wires 7 are placed close to the projecting piece 16 and fixed by the binder band 8, thus there is no need to push the electric wires 7 into a bottom of the opening portion 1a (i.e. into an opposite side of the opening portion) when mounting the cover 12. In other words, since the electric wires 7 are positioned at a predetermined position at the passage portion 1, the electric wires 7 can be prevented from being stuck between the cover 12 and the pair of side walls 13, 15 when mounting the cover 12. Thus, the assembling workability can be improved even more.

Furthermore, the one side wall 13 is provided with the cut-out portion 13b formed by cutting out the edge of the one side wall 13 distant from the bottom wall 14, wherein the binder band 8 is passed through the hole 13a, wound around the electric wires 7 and then passed through the cut-out portion 13b. Consequently, the binder band 8 can be prevented from being displaced along the longitudinal direction, thereby further improving the assembling workability. Moreover, the binder band 8 can be prevented from being stuck between the cover 12 and the side wall 13 when mounting the cover 12, thereby further improving the assembling workability.

Moreover, according to the embodiments described above, there are provided both of the pair of first ribs 18 and the pair of second ribs 19. However, the present invention is not limited to this, and one of the pair of first ribs 18 and the pair of second ribs 19 may be provided. Furthermore, although the embodiments described above includes both of the pair of first ribs 18 and the pair of second ribs 19, the present invention is not limited to this, and the pair of first ribs 18 and the pair of second ribs 19 may be eliminated.

Moreover, according to the embodiments described above, although the passage portion 1 as the electric wire fixing device is provided at the electrical connection box 10, the present invention is not limited to this, and the passage portion 1 as the electric wire fixing device may be used as a protector used in wiring the electric wires 7 within the engine.

The embodiments described herein are only representative embodiments and are not intended to limit the present invention. It will be understood that various modifications to the embodiments may be made without departing the scope of the present invention.

LIST OF REFERENCE SIGNS

1 passage portion
1a opening portion
11 gutter-shaped portion
12 cover
13 side wall (one side wall)
13a hole
13b cut-out portion
14 bottom wall
15 side wall (the other side wall)
16 projecting piece
18 (pair of) first rib(s) (rib)
19 (pair of) second rib(s)
20 protrusion
7 electric wire
8 binder band (fixation member)

The invention claimed is:

1. An electric wire fixing device comprising a gutter-shaped portion within which an electric wire is disposed, the gutter-shaped portion including:
   a bottom wall at which the electric wire is disposed; and
   a pair of side walls extending from the bottom wall so as to position the electric wire between each other,
   wherein one side wall of the pair of side walls is provided with a hole configured such that a fixation member fixing the electric wire is passed, through the hole from outside to inside the gutter-shaped portion, and
   wherein the fixation member is passed through the hole and then wound around the electric wire so that the electric wire is placed close to the one side wall and fixed,
   wherein the one side wall is further provided with a projecting piece arranged at an edge of the hole separated from the bottom wall, the projecting piece extending from the one side wall toward the other side wall, and
   wherein the projecting piece is positioned between the electric wire and the bottom wall and is positioned so that the fixation member is passed and positioned between the projecting piece and the bottom wall.

2. The electric wire fixing device according to claim 1, wherein the projecting piece is provided with a protrusion arranged to project towards the electric wire and contact the electric wire.

3. The electric wire fixing device according to claim 2, wherein the protrusion is arranged at an end of the projecting piece distant from the one side wall.

4. The electric wire fixing device according to claim 1 further comprising
   a pair of ribs projecting from the bottom wall towards the electric wire,
   wherein the pair of ribs is located at an interval along a longitudinal direction of the electric wire so that the fixation member is passed between the pair of ribs, and wherein the pair of ribs extends along a direction of movement of the fixation member.

5. The electric wire fixing device according to claim 4, wherein the projecting piece and the pair of ribs are connected to each other.

6. The electric wire fixing device according to claim 4 further comprising
a pair of second ribs projecting from the other side wall towards the electric wire,
wherein the pair of second ribs is located at an interval along a longitudinal direction of the electric wire so that the fixation member is passed between the pair of second ribs, and
wherein the pair of second ribs extends along a direction of movement of the fixation member.

7. The electric wire fixing device according to claim 1 further comprising a cover covering an opening portion located opposite of the bottom wall,
wherein the projecting piece is arranged at a side distant from the opening portion.

8. The electric wire fixing device according to claim 1,
wherein the one side wall is provided with a cut-out portion formed by cutting out an edge of the one side wall distant from the bottom wall,
wherein the fixation member is passed through the hole, wound around the electric wire and then passed through the cut-out portion.

9. The electric wire fixing device according to claim 2 further comprising
a pair of ribs projecting from the bottom wall towards the electric wire,
wherein the pair of ribs is located at an interval along a longitudinal direction of the electric wire so that the fixation member is passed between the pair of ribs, and
wherein the pair of ribs extends along a direction of movement of the fixation member.

10. The electric wire fixing device according to claim 3 further comprising
a pair of ribs projecting from the bottom wall towards the electric wire,
wherein the pair of ribs is located at an interval along a longitudinal direction of the electric wire so that the fixation member is passed between the pair of ribs, and
wherein the pair of ribs extends along a direction of movement of the fixation member.

11. The electric wire fixing device according to claim 9, wherein the projecting piece and the pair of ribs are connected to each other.

12. The electric wire fixing device according to claim 10, wherein the projecting piece and the pair of ribs are connected to each other.

13. The electric wire fixing device according to claim 6 further comprising a cover covering an opening portion located opposite of the bottom wall,
wherein the projecting piece is arranged at a side distant from the opening portion.

14. The electric wire fixing device according to claim 6, wherein the one side wall is provided with a cut-out portion formed by cutting out an edge of the one side wall distant from the bottom wall,
wherein the fixation member is passed through the hole, wound around the electric wire and then passed through the cut-out portion.

15. The electric wire fixing device according to claim 7, wherein the one side wall is provided with a cut-out portion formed by cutting out an edge of the one side wall distant from the bottom wall,
wherein the fixation member is passed through the hole, wound around the electric wire and then passed through the cut-out portion.

16. The electric wire fixing device according to claim 13, wherein the one side wall is provided with a cut-out portion formed by cutting out an edge of the one side wall distant from the bottom wall,
wherein the fixation member is passed through the hole, wound around the electric wire and then passed through the cut-out portion.

17. The electric wire fixing device according to claim 9 further comprising
a pair of second ribs projecting from the other side wall towards the electric wire,
wherein the pair of second ribs is located at an interval along a longitudinal direction of the electric wire so that the fixation member is passed between the pair of second ribs, and
wherein the pair of second ribs extends along a direction of movement of the fixation member.

18. The electric wire fixing device according to claim 10 further comprising
a pair of second ribs projecting from the other side wall towards the electric wire,
wherein the pair of second ribs is located at an interval along a longitudinal direction of the electric wire so that the fixation member is passed between the pair of second ribs, and
wherein the pair of second ribs extends along a direction of movement of the fixation member.

19. The electric wire fixing device according to claim 2 further comprising a cover covering an opening portion located opposite of the bottom wall,
wherein the projecting piece is arranged at a side distant from the opening portion.

20. The electric wire fixing device according to claim 2,
wherein the one side wall is provided with a cut-out portion formed by cutting out an edge of the one side wall distant from the bottom wall,
wherein the fixation member is passed through the hole, wound around the electric wire and then passed through the cut-out portion.

* * * * *